United States Patent
Beal (10) Patent No.: US 11,490,614 B2
(45) Date of Patent: Nov. 8, 2022

(54) TURKEY TAIL DECOY

(71) Applicant: Mitchell W. Beal, Beals, ME (US)

(72) Inventor: Mitchell W. Beal, Beals, ME (US)

(*) Notice: Subject to any disclaimer, the term of this patent is extended or adjusted under 35 U.S.C. 154(b) by 9 days.

(21) Appl. No.: 17/178,093

(22) Filed: Feb. 17, 2021

(65) Prior Publication Data

US 2022/0256836 A1    Aug. 18, 2022

(51) Int. Cl.
     *A01M 31/06*      (2006.01)

(52) U.S. Cl.
     CPC .................................. *A01M 31/06* (2013.01)

(58) Field of Classification Search
     CPC ..... A01M 31/00; A01M 31/004; A01M 31/06
     USPC ............................................................ 43/2, 3
     See application file for complete search history.

(56) References Cited

U.S. PATENT DOCUMENTS

| | | | | |
|---|---|---|---|---|
| 2,443,430 | A * | 6/1948 | Nigro | A46B 3/00 264/261 |
| 4,590,699 | A * | 5/1986 | Nicks | A01M 31/06 43/2 |
| 5,029,408 | A * | 7/1991 | Smith | A01M 31/004 43/1 |
| 5,064,725 | A * | 11/1991 | Acker | B44C 5/02 428/6 |
| 5,274,942 | A | 1/1994 | Lanius | |
| 5,437,935 | A * | 8/1995 | Fredeen | B44C 5/06 428/6 |
| 6,092,322 | A | 7/2000 | Samaras | |
| 6,210,251 | B1 * | 4/2001 | Primos | A01M 31/004 446/397 |
| 6,487,810 | B1 * | 12/2002 | Loughman | A01M 31/06 43/2 |
| 6,708,440 | B2 | 3/2004 | Summers et al. | |
| 6,775,943 | B2 | 8/2004 | Loughman | |
| 7,287,352 | B1 | 10/2007 | Kirby | |
| 7,784,213 | B1 * | 8/2010 | Primos | A01M 31/06 43/2 |
| 8,168,305 | B1 * | 5/2012 | Peterson | B44C 5/02 428/542.2 |
| 8,764,453 | B2 * | 7/2014 | Swarthout | B44C 5/02 40/538 |
| 8,858,235 | B2 * | 10/2014 | Bain | B44C 5/02 434/296 |
| 8,925,240 | B2 | 1/2015 | Beal | |
| 9,346,315 | B2 * | 5/2016 | Powell | B44C 5/02 |
| 9,820,479 | B2 | 11/2017 | Beal | |
| 9,943,074 | B2 * | 4/2018 | Balgaard | A01M 31/06 |
| 10,893,672 | B1 * | 1/2021 | Gotter | A01M 31/06 |
| 11,039,609 | B1 * | 6/2021 | Brooks | G03B 17/561 |
| 11,147,264 | B1 * | 10/2021 | Reynoso | A01M 31/06 |
| 2003/0106253 | A1 * | 6/2003 | Loughman | A01M 31/06 43/2 |
| 2004/0031185 | A1 * | 2/2004 | Summers | A01M 31/06 43/2 |
| 2004/0250461 | A1 * | 12/2004 | Dryer | A01M 31/06 43/2 |

(Continued)

*Primary Examiner* — Brady W Frazier
*Assistant Examiner* — Zoe Tam Tran
(74) *Attorney, Agent, or Firm* — Anthony D. Pellegrini (57) ABSTRACT

A turkey decoy comprised of a moveable tail that is controlled remotely by the operator to produce a life-like animation of the decoy. The movable tail raises and lowers and the tail feathers fan out in a display, simulating realistic activity. The movable components of the decoy are controlled remotely by means of a pull cord.

16 Claims, 7 Drawing Sheets

(56) References Cited

U.S. PATENT DOCUMENTS

| | | | |
|---|---|---|---|
| 2005/0081422 A1* | 4/2005 | Bradford | A01M 31/06 43/2 |
| 2008/0078113 A1* | 4/2008 | Denny | A01M 31/06 43/2 |
| 2008/0216381 A1* | 9/2008 | Wyant | A01M 31/06 43/2 |
| 2010/0115818 A1* | 5/2010 | Rogers | A01M 31/06 43/2 |
| 2011/0232153 A1* | 9/2011 | Jennings, Jr. | A01M 31/06 43/2 |
| 2012/0042561 A1* | 2/2012 | Bain | A01M 31/06 248/689 |
| 2013/0291422 A1* | 11/2013 | Beal | A01M 31/06 43/2 |
| 2016/0198701 A1* | 7/2016 | Bartel | A01M 31/06 43/2 |
| 2016/0249601 A1* | 9/2016 | Cagle | A01M 31/06 43/2 |
| 2017/0176125 A1* | 6/2017 | Pauley | F41A 23/04 |
| 2020/0000085 A1* | 1/2020 | Davis | A01M 31/06 |
| 2021/0337780 A1* | 11/2021 | Makos | A01M 31/06 |

* cited by examiner

TURKEY TAIL DECOY

BACKGROUND OF THE INVENTION

Technical Field

The present invention relates generally to the field of game decoys. More particularly, the present invention is directed to turkey decoys having movement to simulate live wild turkeys.

Description of Prior Art

Turkey decoys are well known in the art. They are used primarily by hunters to attract wild turkeys, though bird watchers also use them. They range from simple, two dimensional cardboard cutouts to realistic three dimensional designs with moving components intended to simulate live turkeys.

Of the turkey decoys that use moving components to simulate live turkeys, most are either limited in the types of movement or limited in the control of the movement, or overly complex and too expensive. For example, U.S. Pat. No. 5,274,942, to Lanius (Jan. 4, 1994), discloses a turkey decoy having a head/neck component that pivots forward and backward and is activated by a string. U.S. Pat. No. 6,092,322, to Samaras (Jul. 25, 2000), discloses a turkey decoy with a movable head. The head is attached to the body by a hook and loop assembly, with movement achieved by naturally occurring wind. U.S. Pat. No. 6,708,440, to Summers, et al. (Mar. 23, 2004), discloses a robotic turkey decoy mounted on a movable self-propelled frame and having a fannable tail assembly. U.S. Pat. No. 6,775,943, to Loughman (Aug. 17, 2004), discloses a turkey decoy with a separate (unattached) rotating tail structure operated by a pull string. U.S. Pat. No. 7,287,352, to Kirby (Oct. 30, 2007), discloses a turkey decoy with a movable anterior portion (head/neck/shoulders) and/or a movable posterior portion (tail/haunch). Movement of either portion is accomplished by a motor and a remote electronic transmitting device.

All of the foregoing designs are limited in the type of movement or the control of the movement. Decoys that depend on naturally occurring wind are useless when the wind does not blow. Decoys that are movable in just one portion do not accurately simulate a live bird. Decoys that require electronic devices to effect movement are too expensive and complicated. Decoys which do not utilize fanning simulated tails are not life-like enough.

It is therefore shown that there is a need for a life-like turkey decoy that comprises a movable tail component to accurately simulate a live turkey while being remotely controlled by an operator, and being inexpensive to manufacture and easy to use and maintain.

It is thus an object of the present invention to provide a life-like turkey decoy comprised of a movable tail component.

It is a further object of the present invention to provide a life-like turkey decoy comprised of a movable tail component that is controllable by a remote operator.

It is yet a further object of the present invention to provide a life-like turkey decoy that simulates a fannable tail.

It is yet a further object of the present invention to provide a life-like turkey decoy that uses real turkey feathers in a fannable tail.

It is yet a further object of the present invention to provide a life-like turkey decoy that is inexpensive to manufacture.

It is yet a further object of the present invention to provide a life-like turkey decoy that is easy to use and maintain.

Other objects of the present invention will be readily apparent from the description that follows.

SUMMARY OF THE INVENTION

The present invention comprises a turkey decoy comprised of a movable tail assembly having tail fanning capabilities, to mimic the activities of a male turkey. The movement of the tail and tail fanning is accomplished by a remote operator, to minimize detection by the prey turkey while providing specific control to the movements of the decoy independently of environmental considerations, such as the lack of wind.

In one embodiment the turkey decoy comprises a frame. Movably coupled to the frame is a tail assembly. The tail assembly is a representation of the tail of a male turkey. The tail assembly may comprise a plurality of real or artificial turkey feathers and is capable of being fanned, i.e., having the feathers movable to either a spread out orientation ("fanned") or a compact orientation ("unfanned"). The turkey decoy may also have a securing member, adapted to secure the decoy to the ground.

The tail assembly is by default oriented in a substantially downward position until movement is initiated by the operator. A cord attached to the tail assembly allows the tail assembly to be moved upward, simulating a turkey raising its tail to attract a mate. The cord may be moved by the operator pulling on it, or by an electric actuator moving it upon receipt of a communication signal. Release of the cord allows the tail assembly to return to the downward position. The tail fanning activity occurs when the tail assembly is moved to the raised position, causing the feathers to fan, simulating a male turkey's mating display.

Other features and advantages of the present invention are described below.

DETAILED DESCRIPTION OF THE INVENTION

Figure 1:
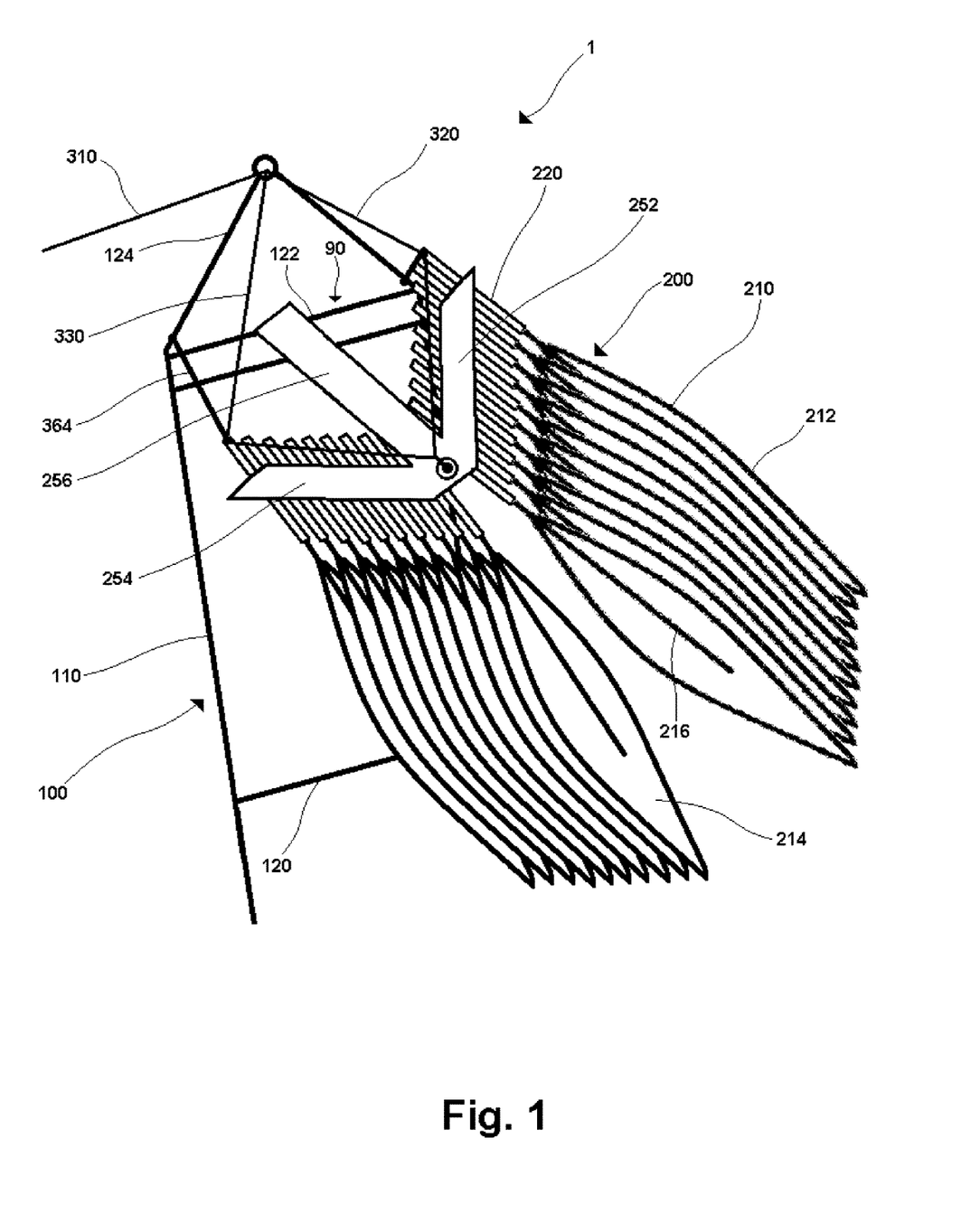
FIG. 1 is a perspective rear view of one embodiment of the device of the present invention. The tail assembly is shown in its lowered orientation and the feather members are unfanned.
Figure 5A:
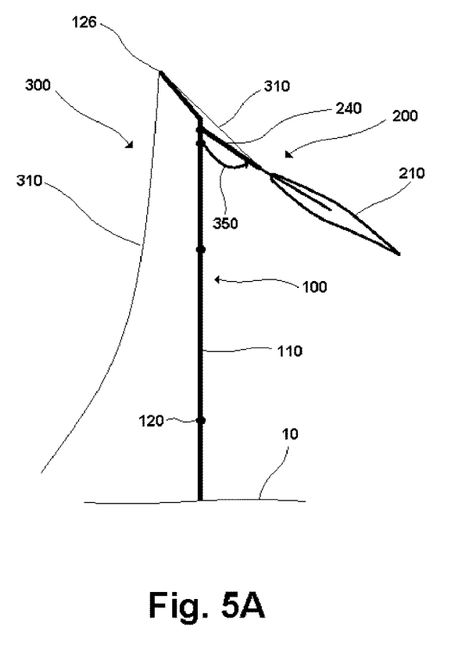
FIG. 5A is a stylized side view of the device of the present invention, showing the tail assembly in the lowered position.

The present invention discloses a turkey decoy 1 having a movable tail. See FIG. 1. The decoy 1 is comprised of a frame 90, a tail assembly 200, and a tail movement mechanism 300. See FIG. 5A. Optionally, the decoy 1 also comprises a securing member 100, which secures the decoy 1 to the ground 10. The tail assembly 200 is pivotally connected to the frame 90 and holds a plurality of feather members 210 in movable relation to each other. The tail movement mechanism 300 causes the tail assembly 200 to move relative to the frame 90 and the feather members 210 to move relative to each other.

The frame 90 provides the structure for the decoy 1. It must be substantially rigid and may be constructed of wood, plastic, composite materials, or other materials, with the preferred embodiment being made of metal. The frame 90 includes a substantially horizontally oriented rod which serves as a pivot point 122 for the tail assembly 200. An optional top cross member 124 of the frame 90 may be angled at its midpoint and attached to the pivot point 122. See FIG. 1.

Figure 2:
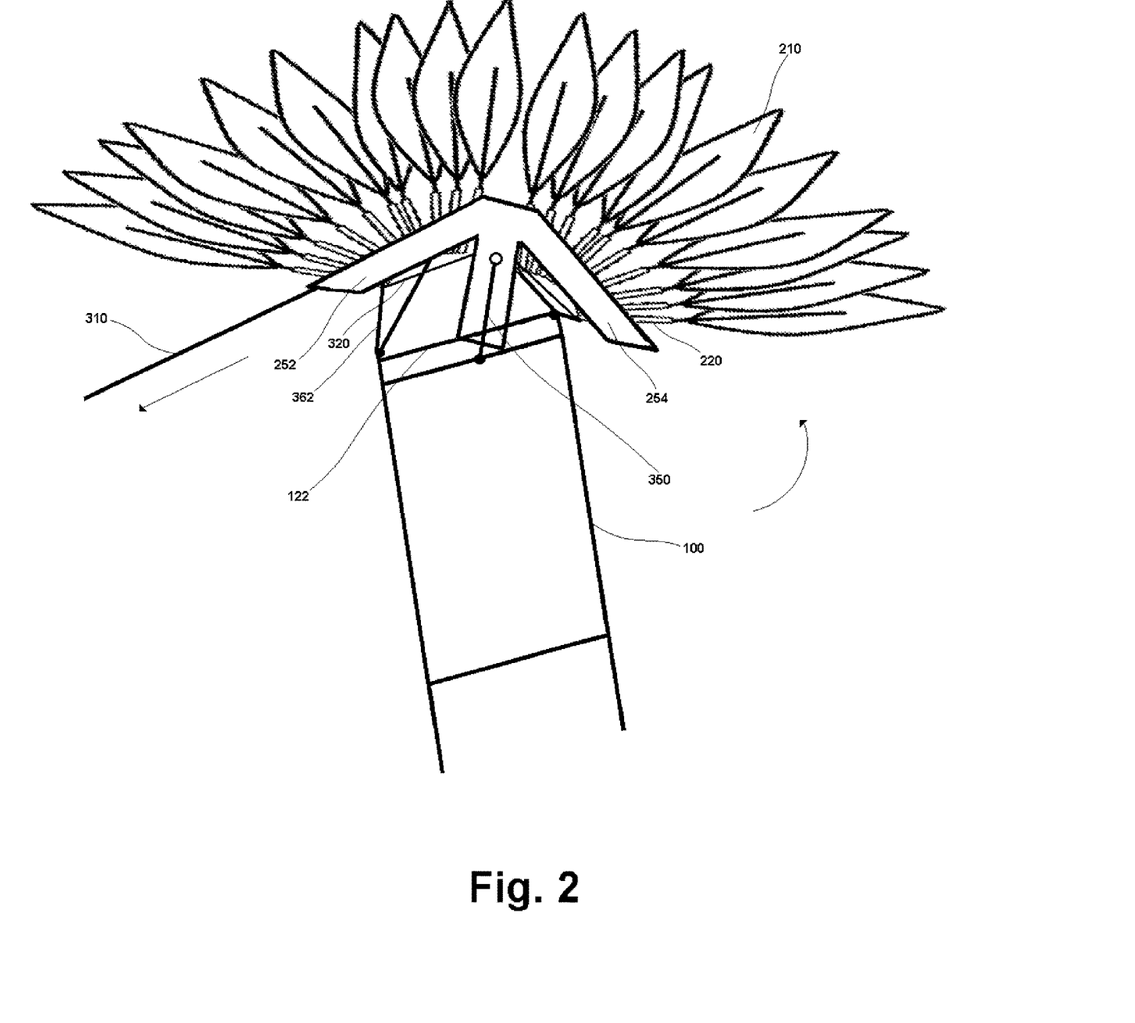
FIG. 2 is a perspective rear view of the embodiment of the device depicted in FIG. 1. The tail assembly is shown in its raised orientation and the feather members are fanned.

The optional securing member 100 can be any device that is capable of securing the decoy 1 to the ground 10. It must be substantially rigid and may be constructed of wood, plastic, composite materials, or other materials, with the preferred embodiment being made of metal. In one embodiment it is comprised of a pair of elongate legs 110, each leg 110 oriented substantially parallel to the other leg 110, with the distal ends of the legs 110 configured to allow for insertion of the lower portions of the legs 110 into the ground 10. See FIGS. 2 and 5A. The distal ends of the legs 110 of the securing member 100 may be pointed to ease insertion into the ground 10. Alternatively, the legs 110 may terminate in feet that rest on the ground 10. Joining the legs 110 are one or more cross members 120, oriented substantially perpendicular to the legs 110. In the preferred embodiment, the frame 90 is integrated with the securing member 100.

The tail assembly 200 is a representation of the tail of a male turkey. It comprises a plurality of feather members 210. Each feather member 210 is comprised of a feather element 212 and a sleeve 220. Each of the feather elements 212 is a representation of a tail feather of a male turkey. It may be made of a synthetic material, such as plastic or vinyl, or paper, or fabric. Such feather elements 212 may be colored in the pattern of a natural turkey tail feather. In the preferred embodiment natural feathers are used for the feather elements 212, preferably natural turkey tail feathers. Each feather element 212 comprises a vane 214 and a shaft 216, with the shaft 216 integrated with the vane 214. The shaft 216 has a distal portion extending beyond the vane 214.

The sleeve 220 of each feather member 210 is elongate and may have a hollow interior and an opening at its upper end. The distal portion of the shaft 216 of each feather element 212 is secured to the sleeve 220, preferably by inserting it through the upper end opening and into the hollow interior of its corresponding sleeve 220, though other means of attachment are also contemplated (for example, by gluing the distal portion of the shaft 216 of each feather element 212 to the upper end of its corresponding sleeve 220). Each sleeve 220 may be cylindrical, or rectangular in cross section, or any other suitable shape, and should be several inches in length. The hollow interior of each sleeve 220 may be fully enclosed by the exterior of the sleeve 220 or open through one or more apertures or slots formed into the exterior of the sleeve 220. In one embodiment, the upper end of each sleeve 220 accommodates multiple feather elements 212, for example, by having a "Y" shape with each arm of the "Y" having a feather element 212 secured thereto.

Figure 3:
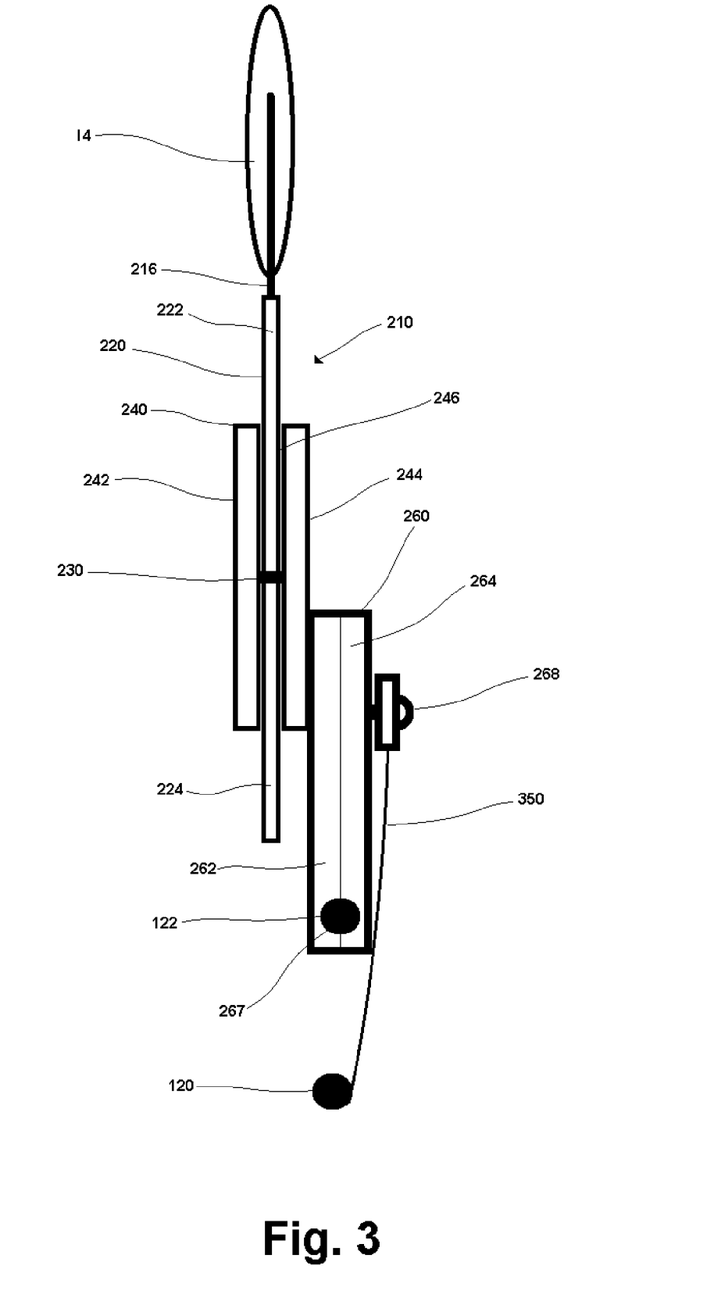
FIG. 3 is a side plan view of the embodiment of the device depicted in FIG. 1 showing the tail assembly in greater detail. Portions of the cross members of the frame are shown, though the legs of the securing member are omitted.

The plurality of feather members 210 is held within a feather member holder 240. See FIGS. 1 and 2. The feather member holder 240 may be comprised of a first plate 242 and a second plate 244, with the first and second plates 242,244 being substantially planar and oriented parallel to and spaced apart from each other, forming a gap 246 therebetween. See FIG. 3. The first and second plates 242,244 may be made of any suitable rigid material; in the preferred embodiment, the plates are made of metal. The feather members 210 are placed within the gap 246 of the feather member holder 240. Alternatively, the feather member holder 240 may be comprised only of a single plate 242; in such embodiment, the feather members 210 are pivotally secured to the feather member holder 240 on one side of the single plate 242.

Figure 4A:
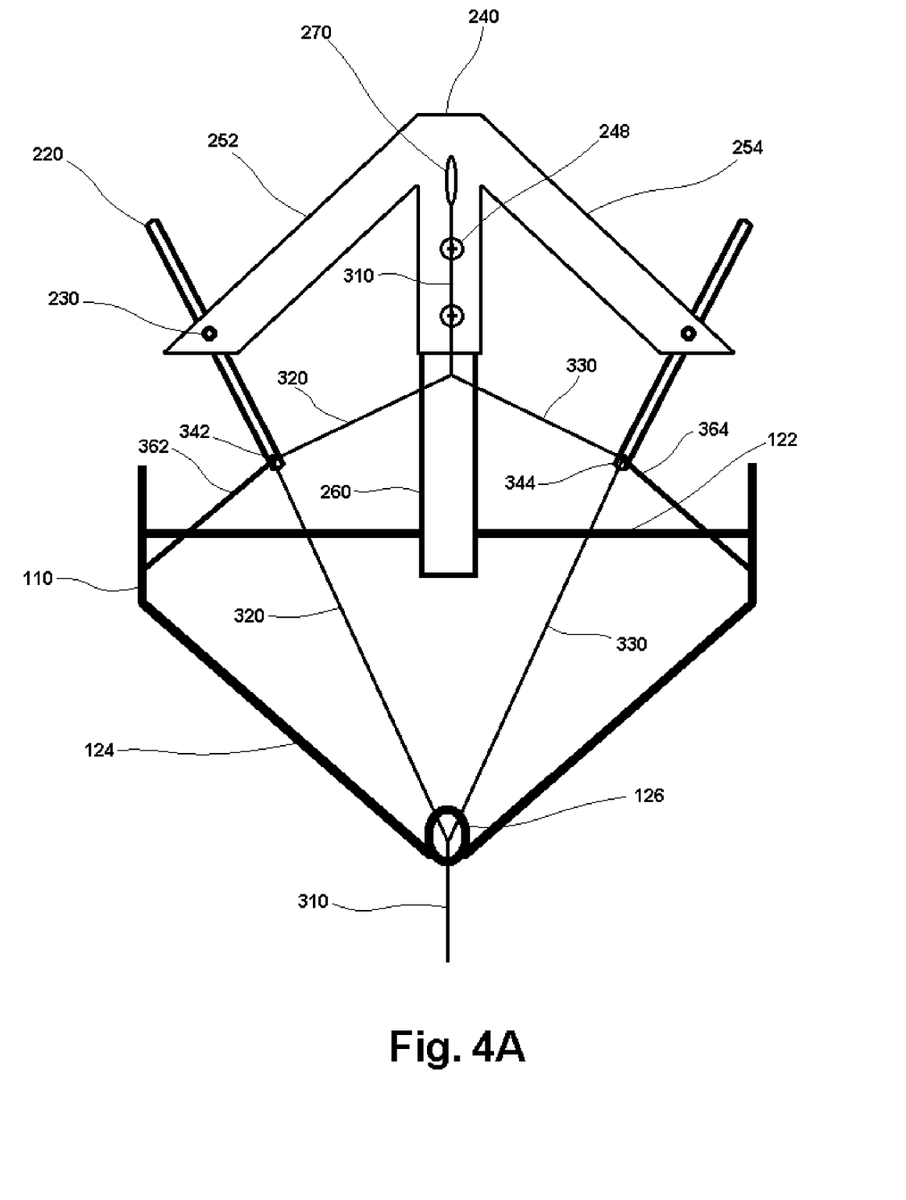
FIG. 4A is a rear plan view of the embodiment of the device depicted in FIG. 1 showing the tail movement mechanism and the tail assembly, with the feather members in an unfanned state (only two of the sleeves of the feather members are shown, and the feather elements of the feather members are omitted).
Figure 4B:
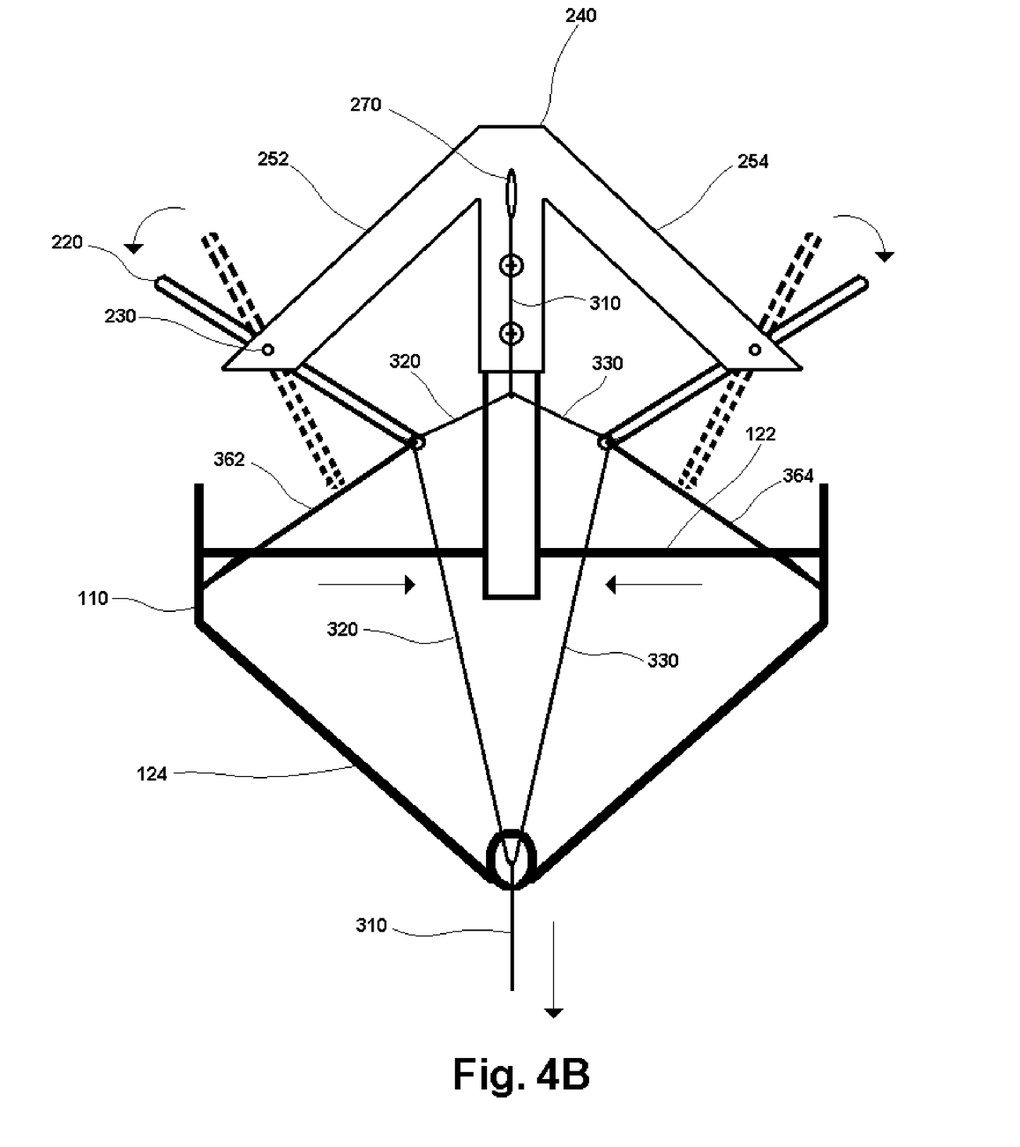
FIG. 4B is a rear plan view of the embodiment of the device depicted in FIG. 4A showing the tail movement mechanism and the tail assembly, with the feather members in their fanned state (only two of the sleeves of the feather members are shown, and the feather elements of the feather members are omitted). Arrows show the direction of movement of components of the tail movement mechanism and the feather members as the tail movement mechanism is used to raise the tail assembly and fan the feather members.

The portion of the feather member holder 240 located on one side of the midpoint of the feather member holder 240 is designated the first arm 252 of the feather member holder 240, and the portion of the feather member holder 240 located on the opposite side of the midpoint of the feather member holder 240 is designated the second arm 254 of the feather member holder 240. The first arm 252 and the second arm 254 of the feather member holder 240 may be collinear, such that, together with a substantially perpendicular central attachment component 256, the feather member holder 240 has a "T" shape. In the preferred embodiment, the first arm 252 of the feather member holder 240 is at an acute angle relative to the central attachment component 256 and the second arm 254 of the feather member holder 240 is at a similar acute angle relative to the central attachment component 256, such that the first and second arms 252,254, together with the central attachment component 256, give the feather member holder 240 an arrow shape. See FIGS. 4A and 4B.

The feather members 210 are arranged linearly within the feather member holder 240, being placed within the gap 246 between the first and second plates 242,244 of the feather member holder 240 such that an upper portion 222 of the sleeve 220 of each feather member 210 extends above the feather member holder 240 and a lower portion 224 of the sleeve 220 of each feather member 210 extends below the feather member holder 240. See FIGS. 1 and 2. Alternatively, where the feather member holder 240 is comprised of just a single plate 242, the feather members 210 are arranged linearly along the single plate 242 of the feather member holder 240 such that an upper portion 222 of the sleeve 220 of each feather member 210 extends above the feather member holder 240 and a lower portion 224 of the sleeve 220 of each feather member 210 extends below the feather member holder 240. The feather members 210 are distributed substantially equally between the first and second arms 252,254 of the feather member holder 240. Each feather member sleeve 220 is pivotally secured within the feather member holder 240. This may be by use of a pivot pin 230 located on the feather member sleeve 220 at a pivot point between the upper and lower portions 222,224 of the sleeve 220, with each said pivot pin 230 running from the first plate 242 to the second plate 244 of the feather member holder 240. Where only a single plate 242 is used, each said pivot pin 230 secures its corresponding sleeve 220 to the single plate of the feather member holder 240.

Figure 6:
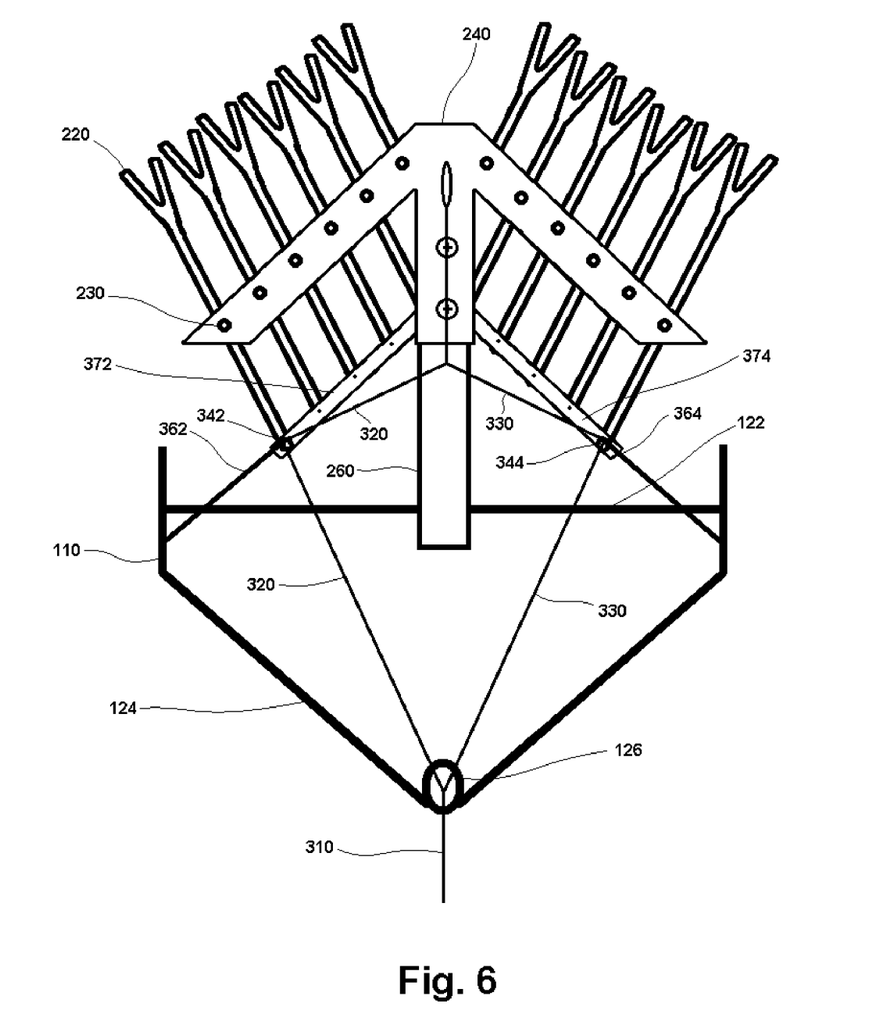
FIG. 6 is a rear plan view of an alternative embodiment of the device using movement rods to effect tail fanning and unfanning movements (the feather elements of the feather members are omitted).

In the preferred embodiment, the feather members 210 are located proximate to each other such that a pivotal movement of one feather member 210 causes it to contact an adjacent feather member 210, which in turn causes said adjacent feather member 210 to pivotally move and contact the next adjacent feather member 210, causing it to pivotally move, and so on. In an alternative embodiment, the lower portion 224 of each sleeve 220 located within the first arm 252 of the feather member holder 240 is pivotally attached to a first movement rod 372, and the lower portion 224 of each sleeve 220 located within the second arm 254 of the feather member holder 240 is pivotally attached to a second movement rod 374. See FIG. 6. The first and second movement rods 372,374 keep the sleeves separate from each other, while movement of the first movement rod 372 causes each sleeve 220 attached thereto to pivot simultaneously with each other sleeve 220 attached thereto, and movement of the second movement rod 374 causes each sleeve 220 attached thereto to pivot simultaneously with each other sleeve 220 attached thereto. Thus is described two alternative tail fanning mechanisms of the tail assembly 200. Each tail fanning mechanism is suitably adapted to move the individual feather members 210 in relation to each other such that the feather members 210 may be positioned in a fanned state and an unfanned state. The tail fanning mechanisms are further adapted to being controlled remotely by an operator.

In one embodiment, the feather member holder 240 has a central attachment component 256, located between the first and second arms 252,254 and extending downward. See FIG. 1. In the preferred embodiment the central attachment component 256 is comprised of a downward extension of the first plate 242 of the feather member holder 240 and a downward extension of the second plate 244 of the feather member holder 240, with the downward extensions of the first and second plates 242,244 being substantially planar and oriented parallel to and spaced apart from each other, forming a gap therebetween. In this embodiment there may be reinforcing members 248 located between the pair of downward extensions. The central attachment component 256 serves as the point of pivotal attachment of the tail assembly 200 to the frame 90. In an alternative embodiment the central attachment component 256 is comprised of a downward extension of the single plate 242 of the feather member holder 240, with the downward extension of the single plate 242 being substantially planar. The central attachment component 256 serves as the point of pivotal attachment of the tail assembly 200 to the frame 90. In one embodiment the lower portion of the central attachment component 256 is curled into a tube. In such embodiment the pivot point cross member 122 of the frame 90 is removable from the frame 90 and insertable through the tube formed into the lower portion of the central attachment component 256, thereby allowing the central attachment component 256 to pivot about the pivot point cross member 122 of the frame 90.

The tail assembly 200 may further comprise an elongate, substantially rigid attachment member 260. The attachment member 260 may be made of metal, plastic, composites, wood, or other materials. It is pivotally attached at its lower end to the frame 90 at the pivot point cross member 122 of the frame 90. The attachment member 260 of the tail assembly 200 is secured to the central attachment component 256 of the feather member holder 240. In one embodiment, the attachment member 260 of the tail assembly 200 is integrated with the central attachment component 256 of the feather member holder 240, such that the central attachment component 256 serves as the attachment member 260. The point of attachment of the attachment member 260 to the frame 90 may be one or more rings affixed to the lower portion of the attachment member 260, or it may be an aperture 267 passing through the lower portion of the attachment member 260; in either case, the pivot point cross member 122 passes therethrough. In one embodiment, where there is an aperture 267 in the attachment member 260, the attachment member 260 may have a first portion 262 and a second portion 264, where the first and second portions 262,264 are joined together. In this embodiment the first and second portions 262,264 are removably secured to each other around the pivot point cross member 122 of the frame 90 by one or more fasteners 268, for example, by bolts and wingnuts. See FIG. 3. In another embodiment, the attachment member 260 is monolithic, with an aperture 267 formed into its lower end. In such embodiment the pivot point cross member 122 of the frame 90 is removable from the frame 90 and insertable through the aperture 267 of the attachment member 260. This same configuration may be used where there are one or more rings affixed to the lower portion of the attachment member 260.

Figure 5B:
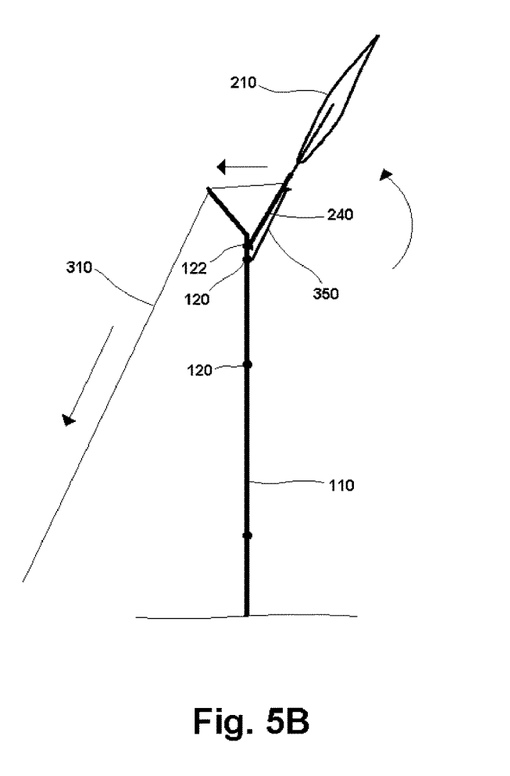
FIG. 5B is a stylized side view of the device depicted in FIG. 5A, showing the tail assembly in the raised position. Arrows show the direction of movement of components of the tail movement mechanism and the tail assembly as the tail movement mechanism is used to raise the tail assembly.

The tail movement mechanism 300 is configured to cause the tail assembly 200 to move relative to the frame 90, and is further adapted to being controlled remotely by an operator. In one aspect the tail movement mechanism 300 raises the tail assembly 200 relative to the ground 10. See FIGS. 5A and 5B. In another aspect the tail movement mechanism 300 causes the plurality of feather members 210 of the tail assembly 200 to fan out relative to each other. See FIGS. 1 and 2. The tail movement mechanism 300 may rely upon gravity to lower the tail assembly 200 and to unfan the feather members 210, or it can use biasing means to achieve these actions. In the preferred embodiment the tail movement mechanism 300 employs a control cord 310 in fixed and moveable connection with various components of the decoy 1 to cause the raising of the tail assembly 200 and the fanning of the feather members 210, and employs a plurality of biasing means to reverse these actions. The control cord 310 may be made of any suitable material, e.g., twine, monofilament line, wire, cabling, etc., or a combination of same.

An operator controls the movement of the tail assembly 200 by applying or releasing a force, respectively, to the control cord 310. The application of a force on the control cord 310 is suitably adapted to move the tail assembly 200 in a substantially upward direction. The release of a force from the control cord 310 is suitably adapted to allow the tail assembly 200 to move in a substantially downward direction. The applying or releasing of the force may be accomplished by the operator manually pulling on the control cord 310. In such case the control cord 310 may be of considerable length, preferably of several dozen yards, to allow the operator to control the movement of the tail assembly 200 remotely and out of detection of intended prey turkeys. The applying or releasing of the force may alternatively be accomplished electronically. In such case the control cord 310 is relatively short and is attached to a small electronic actuator which is activated by a remote electronic signaling device.

In one embodiment, the tail assembly 200 comprises a control cord attachment point 270 located on the central attachment component 256 of the feather member holder 240 of the tail assembly 200. See FIG. 4A. The control cord 310 is attached to the control cord attachment point 270. The control cord attachment point 270 may be a ring affixed to the central attachment component 256 of the feather member holder 240. Pulling on the control cord 310 causes the tail assembly 200 to pivot upward relative to the ground 10. See FIGS. 2 and 5B. When the control cord 310 is released, gravity causes the tail assembly 200 to pivot downward relative to the ground 10. See FIGS. 1 and 5A. Alternately, one or more tail assembly biasing members 350, such as springs or rubber bands, may be attached to the tail assembly 200 on the side of the tail assembly 200 opposite the control cord attachment point 270 and to the securing member 100, preferably to a cross member 120 located proximate to the pivot point cross member 122. When the control cord 310 is pulled and the tail assembly 200 pivots upward, the tail assembly biasing member 350 is extended, and when the control cord 310 is released the tail assembly biasing member 350 retracts and assists in pivoting the tail assembly 200 downward. In a preferred embodiment, the top cross member 124 of the frame 90 comprises a control cord guide 126 at its midpoint. The control cord guide 126 may be an aperture in the top cross member 124 or a ring affixed thereto. The control cord 310 passes through the control cord guide 126 to the control cord attachment point 270.

In one embodiment, the sleeve 220 of one of the feather members 210 located within the first arm 252 of the feather member holder 240 has a sleeve cord guide 342 located at its lower end, and the sleeve 220 of one of the feather members 210 located within the second arm 254 of the feather member holder 240 has a sleeve cord guide 344 located at its lower end. Preferably, the outermost sleeves 220 of the first and second arms 252,254 are fitted with the sleeve cord guides 342,344. These sleeve cord guides 342, 344 may be rings or hooks affixed to the sleeves 220. A portion of the control cord 310 proximate to the control cord attachment point 270 is comprised of a pair of sub-control cords 320,330, of substantially equal length. The first sub-control cord 320 passes through the sleeve cord guide 342 of the sleeve 220 of the feather member 210 located within the first arm 252, while the second sub-control cord 330 passes through the sleeve cord guide 344 of the sleeve 220 of the feather member 210 located within the second arm 254. See FIG. 4A. So configured, the first and second sub-control cords 320,330 form a diamond shape. Pulling on the control cord 310 causes the first and second sub-control cords 320,330 to be drawn towards each other, which in turn causes the lower portion 224 of the sleeve 220 of the feather member 210 located within the first arm 252 to pivot towards the central attachment component 256 of the feather member holder 240, and the lower portion 224 of the sleeve 220 of the feather member 210 located within the second arm 254 to pivot towards the central attachment component 256 of the feather member holder 240. See FIG. 4B. This inward movement of the lower portions 224 of the sleeves 220 causes those sleeves 220 to press against and move the lower portions 224 of the sleeves 220 of the feather members 210 adjacent thereto, which in turn move the sleeves 220 adjacent thereto, and so on, resulting in all of the lower portions 224 of the sleeves 220 of the feather members 210 to simultaneously pivot toward the central attachment component 256 of the feather member holder 240. Concomitantly, all of the upper portions 222 of the sleeves 220 of the feather members 210 simultaneously pivot away from the central attachment component 256 of the feather member holder 240, resulting in the fanning of the feather members 210 of the tail assembly 200. See FIG. 2. The application of force to the control cord 310 which causes the lifting of the tail assembly 200 thus also causes the fanning of the feather members 210, and the release of force from the control cord 310 which causes the lowering of the tail assembly 200 also causes the unfanning of the feather members 210. In another embodiment, no sub-control cords 320,330 are used, and instead the sleeves 220 pivot to a fanned state and to an unfanned state merely by force of gravity.

In the preferred embodiment, a biasing mechanism, such as a spring or a rubber band, may be attached to each of the sleeve cord guides 342,344 of the sleeves 220 and to the frame 90, or alternatively to the legs 110 of the securing member 100. See FIG. 4A. When the control cord 310 is pulled and the pair of sub-control cords 320,330 move towards each other, the first feather member biasing member 362 and the second feather member biasing member 364 are extended, see FIG. 4B, and when the control cord 310 is released the first feather member biasing member 362 and the second feather member biasing member 364 retract and draw the sub-control cords 320,330 apart. The retraction of the feather member biasing members 362,364 also moves the lower portions 224 of the sleeves 220 in the opposite direction as described above, resulting in all of the lower portions 224 of the sleeves 220 of the feather members 210 simultaneously pivoting away from the central attachment component 256 of the feather member holder 240, and all of the upper portions 222 of the sleeves 220 of the feather members 210 simultaneously pivoting toward the central attachment component 256 of the feather member holder 240, resulting in the unfanning of the feather members 210 of the tail assembly 200.

In an alternative embodiment comprising the first and second movement rods 372,374, the first movement rod 372 has a sleeve cord guide 342 attached thereto, preferably located at its outside end, and the second movement rod 374 has a sleeve cord guide 344 attached thereto, preferably located at its outside end. These sleeve cord guides 342,344 are as described above. As described above, the first sub-control cord 320 passes through the sleeve cord guide 342 of the first movement rod 372, while the second sub-control cord 330 passes through the sleeve cord guide 344 of the second movement rod 374. See FIG. 6. Pulling on the control cord 310 causes the first and second sub-control cords 320,330 to be drawn towards each other, which in turn causes the first and second movement rods 372,374 to pivot towards the central attachment component 256 of the feather member holder 240, resulting in the lower portion 224 of the sleeves 220 to also pivot towards the central attachment component 256 of the feather member holder 240. As described above, this inward movement of the lower portions 224 of the sleeves 220 causes all of the upper portions 222 of the sleeves 220 of the feather members 210 to simultaneously pivot away from the central attachment component 256 of the feather member holder 240, resulting in the fanning of the feather members 210 of the tail assembly 200. The application of force to the control cord 310 causes the fanning of the feather members 210, and the release of force from the control cord 310 causes the unfanning of the feather members 210. As described above, a biasing mechanism may be used to facilitate to unfanning of the feather members 210.

What has been described and illustrated herein is a preferred embodiment of the turkey tail decoy 1 of the present invention, along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. A turkey decoy comprising a frame, a tail assembly, and a tail movement mechanism;
    wherein said frame is substantially rigid and is adapted to pivotally attach said tail assembly, wherein said frame comprises a cross member used as a pivot point for the tail assembly, said cross member being a substantially horizontally oriented rod,
    said tail assembly is a representation of the tail of a male turkey and comprises a plurality of feather members and a feather member holder, with the plurality of feather members held within the feather member holder, wherein each feather member of the tail assembly is comprised of a feather element and a sleeve, with said feather members being movable in relation to each other, and
    said tail movement mechanism is suitably adapted to pivotally move the tail assembly in relation to the frame, and to move the feather members in relation to each other, with said tail movement mechanism further adapted to being controlled remotely by an operator;
    wherein the feather member holder is comprised of a first plate and a second plate, with the first and second plates being substantially planar and oriented parallel to and spaced apart from each other, forming a gap therebetween, whereby the feather members are located within the gap of the feather member holder and the sleeves of the feather members are pivotally secured therein.

2. The decoy of claim 1 wherein the feather member holder is comprised of a first arm, a second arm, and a central attachment component, with the first arm located on one side of a midpoint of the feather member holder, the second arm located on an opposite side of the midpoint, and the central attachment component located between the first and second arms and extending in a downward direction;
    whereby the feather members are arranged linearly within the feather member holder, being placed within the gap between the first and second plates of the feather member holder such that an upper portion of the sleeve of each feather member extends above the feather member holder and a lower portion of the sleeve of each feather member extends below the feather member holder, with the feather members distributed substantially equally between the first and second arms of the feather member holder, and
    the central attachment component provides an interface between the tail assembly and the frame.

3. The decoy of claim 2 wherein each sleeve of the feather members is pivotally secured within the feather member holder by use of a pivot pin located on the sleeve at a pivot point between the upper and lower portions of the sleeve, with each said pivot pin running from the first plate to the second plate of the feather member holder;
    whereby the feather members are located proximate to each other such that a pivotal movement of one feather member causes it to contact and pivotally move an adjacent feather member.

4. The decoy of claim 2 wherein the central attachment component serves as a point of pivotal attachment of the tail assembly to the pivot point cross member of the frame.

5. The decoy of claim 2 wherein the tail assembly further comprises an elongate, substantially rigid attachment member;
    whereby said attachment member is pivotally attached at its lower end to the pivot point cross member of the frame and is fixedly attached at its upper end to the central attachment component of the feather member holder.

6. The decoy of claim 5 wherein the attachment member of the tail assembly has a first portion and a second portion, where the first and second portions are joinable, with concavities formed into lower ends of the first and second portions of the attachment member such that said concavities together form an aperture which accommodates the pivot point cross member of the frame, with the first and second portions of the attachment member being removably secured to each other by one or more fasteners.

7. The decoy of claim 3 wherein the tail movement mechanism comprises a control cord in connection with the tail assembly to raise and lower the tail assembly and to fan and unfan the feather members;
    whereby the operator controls movement of the tail assembly by applying or releasing a force to the control cord, with an application of a force on the control cord resulting in the movement of the tail assembly in a substantially upward direction and a fanning of the feather members, and a release of a force from the control cord resulting in a movement of the tail assembly in a substantially downward direction and an unfanning of the feather members.

8. The decoy of claim 7 wherein the tail assembly further comprises a control cord attachment point located on the central attachment component of the feather member holder of the tail assembly, with an end of the control cord being attached to the control cord attachment point.

9. The decoy of claim 8 wherein the tail movement mechanism further comprises one or more tail assembly biasing members, with said one or more tail assembly biasing members in connection with the tail assembly and in connection with the frame,
    wherein each of said one or more tail assembly biasing members is configured to bias the tail assembly towards a downward orientation.

10. The decoy of claim 7 wherein the tail movement mechanism further comprises a first sleeve cord guide and a second sleeve cord guide, and the control cord comprises a first sub-control cord and a second sub-control cord,
    wherein the first sleeve cord guide is located at the lower portion of the sleeve of one of the feather members located within the first arm of the feather member holder,
    the second sleeve cord guide is located at the lower portion of the sleeve of one of the feather members located within the second arm of the feather member holder,
    the first sub-control cord has a first end and a second end and forms a portion of the control cord proximate to the control cord attachment point,
    the second sub-control cord has a first end and a second end and forms a portion of the control cord proximate to the control cord attachment point, said second sub-control cord being of substantially the same length as the first sub-control cord, with the first end of the second sub-control cord fixedly attached to the first end of the first sub-control cord and the second end of the second sub-control cord fixedly attached to the second end of the first sub-control cord;

wherein the first sub-control cord is configured to pass through the sleeve cord guide of the sleeve of the feather member located within the first arm of the feather member holder, and the second sub-control cord is configured to pass through the sleeve cord guide of the sleeve of the feather member located within the second arm of the feather member holder;

whereby the operator controls movement of the feather members by applying or releasing a force to the control cord, with an application of a force on the control cord causing the first sub-control cord and second sub-control cord to be drawn towards each other, causing the lower portion of the sleeve of the feather member to which the first sleeve cord guide is attached to pivot towards the central attachment component of the feather member holder and the lower portion of the sleeve of feather member to which the second sleeve cord guide is attached to pivot towards the central attachment component of the feather member holder, thereby moving the lower portions of the sleeves of the remaining feather members in a like manner towards the central attachment component of the feather member holder, resulting in the upper portions of said sleeves to move away from the central attachment component of the feather member holder, effecting a fanning of the feather members, and a release of force on the control cord causing the first sub-control cord and second sub-control cord to be move away from each other, causing the lower portion of the sleeve of the feather member to which the first sleeve cord guide is attached to pivot away from the central attachment component of the feather member holder and the lower portion of the sleeve of the feather member to which the second sleeve cord guide is attached to pivot away from the central attachment component of the feather member holder, thereby moving the lower portions of the sleeves of the remaining feather members in a like manner away from the central attachment component of the feather member holder, resulting in the upper portions of said sleeves to move towards the central attachment component of the feather member holder, effecting an unfanning of the feather members.

11. The decoy of claim 10 wherein the tail movement mechanism further comprises a first feather member biasing member and a second feather member biasing member,
with the first feather member biasing member in connection with the first sleeve cord guide and in connection with the frame, and
the second feather member biasing member in connection with the second sleeve cord guide and in connection with the frame;
wherein the first feather member biasing member and the second feather member biasing member is each configured to bias the feather members towards an unfanned orientation.

12. A turkey decoy comprising a frame, a securing member, a tail assembly, and a tail movement mechanism;
wherein said frame is substantially rigid and is adapted to pivotally attach said tail assembly, wherein said frame comprises a cross member used as a pivot point for the tail assembly,
said securing member is substantially rigid, and has a distal end adapted to being in contact with the ground, with said securing member comprising
a pair of elongate legs, each leg oriented substantially parallel to the other leg, with distal ends of said legs configured to allow for insertion of lower portions of said legs into the ground, and
one or more cross members, each said cross member being oriented substantially perpendicular to and attached to the legs,
whereby said securing member is adapted to secure said decoy to the ground,
said securing member is integrated with the frame, said frame and securing member forming a monolithic component,
said tail assembly is a representation of the tail of a male turkey and comprises a plurality of feather members and a feather member holder, with the plurality of feather members held within the feather member holder, wherein each feather member of the tail assembly is comprised of a feather element and a sleeve, with said feather elements being inserted into said sleeves and with said sleeves of the feather members being pivotally secured to the feather member holder and movable in relation to each other, and
said tail movement mechanism is suitably adapted to pivotally move the tail assembly in relation to the frame, and to move the feather members in relation to each other, with said tail movement mechanism further adapted to being controlled remotely by an operator.

13. The turkey decoy of claim 7 wherein the application or releasing of the force to the control cord is accomplished through the use of an electronic device which is remotely activated by the operator.

14. A turkey decoy comprising a frame, a tail assembly, and a tail movement mechanism;
wherein said frame is substantially rigid and is adapted to pivotally attach said tail assembly, wherein said frame comprises a cross member used as a pivot point for the tail assembly,
said tail assembly is a representation of the tail of a male turkey and comprises a feather member holder and a plurality of feather members, with said feather members being movable in relation to each other, and
said tail movement mechanism is suitably adapted to pivotally move the tail assembly in relation to the frame, and to move the feather members in relation to each other, with said tail movement mechanism further adapted to being controlled remotely by an operator,
with each feather member of the tail assembly being comprised of a feather element and a sleeve, and
each feather element of the feather members is a representation of one or more tail feathers of a male turkey, with each of the one or more tail feathers of each feather element comprising a vane and a shaft, with the shaft integrated with the vane and a distal portion of the shaft extending beyond the vane, and
each sleeve of each feather member is elongate with an upper portion, wherein said upper portion of each sleeve is configured to have attached thereto the one or more tail feathers comprising each said feather element, whereby the distal portion of the shaft of each of the one or more tail feathers of each feather element is adapted to be secured to the upper portion of its corresponding sleeve, and each sleeve is pivotally secured to the feather member holder.

15. A turkey decoy comprising a frame, a tail assembly, and a tail movement mechanism;
wherein said frame is substantially rigid and is adapted to pivotally attach said tail assembly, wherein said frame comprises a cross member used as a pivot point for the tail assembly,
said tail assembly is a representation of the tail of a male turkey and comprises a plurality of feather members and a feather member holder, with the plurality of feather members held within the feather member holder, wherein each feather member of the tail assembly is comprised of a feather element and a sleeve, with said feather members being movable in relation to each other, and
said tail movement mechanism is suitably adapted to pivotally move the tail assembly in relation to the frame, and to move the feather members in relation to each other, with said tail movement mechanism further adapted to being controlled remotely by an operator;
wherein the feather members are pivotally secured to the feather member holder, with each sleeve of the feather members being pivotally secured within the feather member holder by use of a pivot pin located on the sleeve at a pivot point between the upper and lower portions of the sleeve;
the feather member holder is comprised of a first arm, a second arm, and a central attachment component, with the first arm located on one side of a midpoint of the feather member holder, the second arm located on an opposite side of the midpoint, and the central attachment component located between the first and second arms and extending in a downward direction, whereby the feather members are arranged linearly within the feather member holder, such that an upper portion of the sleeve of each feather member extends above the feather member holder and a lower portion of the sleeve of each feather member extends below the feather member holder, with the feather members distributed substantially equally between the first and second arms of the feather member holder, and the central attachment component provides an interface between the tail assembly and the frame;
the tail movement mechanism comprises a control cord in connection with the tail assembly to raise and lower the tail assembly and to fan and unfan the feather members;
the tail movement mechanism further comprises a first movement rod, a second movement rod, a first sleeve cord guide, and a second sleeve cord guide, and the control cord comprises a first sub-control cord and a second sub-control cord,
wherein the lower portion of each sleeve located within the first arm of the feather member holder is pivotally attached to the first movement rod, and the lower portion of each sleeve located within the second arm of the feather member holder is pivotally attached to the second movement rod, with the first and second movement rods keeping their respective sleeves apart from each other, whereby movement of the first movement rod causes each sleeve attached thereto to pivot simultaneously with each other sleeve attached thereto, and movement of the second movement rod causes each sleeve attached thereto to pivot simultaneously with each other sleeve attached thereto,
wherein the first sleeve cord guide is located on the first movement rod and the second sleeve cord guide is located on the second movement rod,
the first sub-control cord has a first end and a second end and forms a portion of the control cord proximate to the control cord attachment point,
the second sub-control cord has a first end and a second end and forms a portion of the control cord proximate to the control cord attachment point, said second sub-control cord being of substantially the same length as the first sub-control cord, with the first end of the second sub-control cord fixedly attached to the first end of the first sub-control cord and the second end of the second sub-control cord fixedly attached to the second end of the first sub-control cord;
wherein the first sub-control cord is configured to pass through the sleeve cord guide of the first movement rod, and the second sub-control cord is configured to pass through the sleeve cord guide of the second movement rod;
whereby the operator controls movement of the feather members by applying or releasing a force to the control cord,
with an application of a force on the control cord causing the first sub-control cord and second sub-control cord to be drawn towards each other, causing the first movement rod to move towards the central attachment component of the feather member holder and the second movement rod to move towards the central attachment component of the feather member holder, thereby moving the lower portions of the sleeves of the feather members attached thereto in a like manner towards the central attachment component of the feather member holder, resulting in the upper portions of said sleeves to move away from the central attachment component of the feather member holder, effecting a fanning of the feather members, and
a release of force on the control cord causing the first sub-control cord and second sub-control cord to be move away from each other, causing the first movement rod to move away from the central attachment component of the feather member holder and the second movement rod to move away from the central attachment component of the feather member holder, thereby moving the lower portions of the sleeves of the feather members attached thereto in a like manner away from the central attachment component of the feather member holder, resulting in the upper portions of said sleeves to move towards the central attachment component of the feather member holder, effecting an unfanning of the feather members.

16. The decoy of claim 12 wherein the frame is further comprised of a top cross member which is angled at its midpoint and oriented at an angle relative to the legs of the securing member.

* * * * *